United States Patent
Wang et al.

(10) Patent No.: US 8,538,187 B2
(45) Date of Patent: Sep. 17, 2013

(54) DEFOCUS CALIBRATION MODULE FOR LIGHT-SENSING SYSTEM AND METHOD THEREOF

(75) Inventors: Wei-Chung Wang, Hsin-Chu (TW); Hui-Hsuan Chen, Hsin-Chu (TW)

(73) Assignee: PixArt Imaging Inc., Science-Based Industrial Park, Hsin-Chu (TW)

( * ) Notice: Subject to any disclaimer, the term of this patent is extended or adjusted under 35 U.S.C. 154(b) by 678 days.

(21) Appl. No.: 12/818,112

(22) Filed: Jun. 17, 2010

(65) Prior Publication Data

US 2011/0243541 A1 Oct. 6, 2011

(30) Foreign Application Priority Data

Mar. 31, 2010 (TW) ................................. 99109894 A

(51) Int. Cl.
*G06K 9/40* (2006.01)
*G03B 27/74* (2006.01)
*G01B 11/14* (2006.01)

(52) U.S. Cl.
USPC .............................. 382/255; 355/68; 356/614

(58) Field of Classification Search
None
See application file for complete search history.

(56) References Cited

U.S. PATENT DOCUMENTS

| | | | | | |
|---|---|---|---|---|---|
| 4,922,281 A | * | 5/1990 | Kitajima | ................ | 396/121 |
| 5,307,175 A | * | 4/1994 | Seachman | ................ | 358/401 |
| 5,367,153 A | * | 11/1994 | Suda et al. | ................ | 250/201.8 |
| 5,422,870 A | * | 6/1995 | Kojima et al. | ............ | 369/44.12 |
| 5,936,711 A | * | 8/1999 | Miyai et al. | ................ | 355/55 |
| 5,936,712 A | * | 8/1999 | Ito et al. | ................ | 355/55 |
| 6,567,570 B1 | * | 5/2003 | Steinle et al. | ................ | 382/312 |
| 7,420,676 B2 | * | 9/2008 | Lof et al. | ................ | 356/401 |
| 7,528,966 B2 | * | 5/2009 | Matsumoto | ................ | 356/614 |
| 8,159,599 B2 | * | 4/2012 | Takamiya | ................ | 348/345 |
| 2004/0109080 A1 | * | 6/2004 | Chan et al. | ................ | 348/345 |
| 2006/0250664 A1 | * | 11/2006 | Chien | ................ | 358/474 |
| 2007/0268376 A1 | * | 11/2007 | Yoshikawa et al. | ........ | 348/222.1 |
| 2008/0036990 A1 | * | 2/2008 | Hirai et al. | ................ | 355/68 |
| 2008/0080028 A1 | * | 4/2008 | Bakin et al. | ................ | 358/514 |
| 2008/0107309 A1 | * | 5/2008 | Cerni | ................ | 382/115 |
| 2008/0160425 A1 | * | 7/2008 | Hong | ................ | 430/5 |
| 2009/0244168 A1 | * | 10/2009 | Kakutani | ................ | 347/21 |
| 2010/0310165 A1 | * | 12/2010 | Chen et al. | ................ | 382/167 |
| 2011/0164229 A1 | * | 7/2011 | Staals et al. | ................ | 355/53 |
| 2012/0069320 A1 | * | 3/2012 | Simonov et al. | ............ | 356/4.04 |

* cited by examiner

*Primary Examiner* — Wenpeng Chen
(74) *Attorney, Agent, or Firm* — Winston Hsu; Scott Margo

(57) ABSTRACT

A defocus calibration module is applied in a light-sensing system for sensing a measured object to generate a sensed image. The light-sensing system contains a light-emitting component, a focusing component, and an image sensor. The light-emitting component emits a detecting light to the measured object so that the measured object generates a reflecting light. The focusing component focuses the reflecting light to the image sensor, and the image sensor generates the sensed image according to the reflecting light. The defocus calibration module has a calibrating object for blocking a part of the detecting light and the reflecting light for forming images at a first and a second calibration imaging locations in the sensed image. In this way, the defocus calibration module calculates a defocus parameter representing the defocus level of the light-sensing system according to the first and the second calibration imaging locations, and accordingly calibrates the sensed image.

16 Claims, 6 Drawing Sheets

DEFOCUS CALIBRATION MODULE FOR LIGHT-SENSING SYSTEM AND METHOD THEREOF

BACKGROUND OF THE INVENTION

1. Field of the Invention

The present invention is related to a defocus calibration module, and more particularly, to a defocus calibration module applied in a light-sensing system.

2. Description of the Prior Art

Please refer to FIG. 1. FIG. 1 is a diagram illustrating a conventional light-sensing system 100. The light-sensing system 100 is utilized for sensing a measured object MO so as to generate a sensed image SIM. The light-sensing system 100 includes a light-emitting component 110, a focusing component 120, and an image sensor 130. The light-emitting component 110 emits a detecting light $L_D$ to the measured object MO, so that the measured object MO generates a reflecting light $L_R$. The image sensor 130 generates a sensed image SIM according to the reflecting light $L_R$. The focusing component 120 is utilized for focusing the reflecting light $L_R$ to the image sensor 130. In FIG. 1, m represents the magnification of the focusing component. The front focal distance and the back focal distance of the light-emitting component 120 are D and mD, respectively. The front focal surface and the back focal surface of the focusing component 120 are $SU_F$ and $SU_R$, respectively. The image sensor 130 is disposed on the back focal surface $SU_R$ of the focusing component 120. A substrate 101 is disposed on the front focal surface $SU_F$ of the focusing component 120, and the distance between the substrate 101 and the focusing component 120 is the predetermined distance D (that is, the front focal distance D of the focusing component 120). When the measured object MO touches the substrate 101, it represents the length of the distance between the measured object MO and the focusing component 120 is equal to the length of the front focal distance D of the focusing component 120. Provided that the length of the distance between the image sensor 130 and the focusing component is also equal to the length of the back focal distance mD of the focusing component 120, the reflecting light $L_R$ is exactly focused on the image sensor 130 so that the image sensor 130 can generate a clear sensed image SIM. However, when the light-sensing system 100 has an assembling error, it is possible that the length of the distance between the image sensor 130 and the focusing component 120 is not equal to the length of the back focal distance mD of the focusing component 120, or the length of the distance between the substrate 101 and the focusing component 120 is not equal to the length of the front focal distance D of the focusing component 120. In addition, it is possible that the measured object MO does not touch the substrate 101 when the measured object MO forms image on the image sensor 130. In this way, the reflecting light $L_R$ generated by the measured object MO can not be exactly focused on the image sensor 130, so that the sensed image SIM generated by the image sensor 130 is unclear.

SUMMARY OF THE INVENTION

The present invention provides a defocus calibration module. The defocus calibration module is applied in a light-sensing system. The light-sensing system is utilized for sensing a measured object for generating a sensed image. The light-sensing system has a lighting-emitting component, a focusing component, and an image sensor. The light-emitting component emits a detecting light to the measured object so that the measured object accordingly generates a reflecting light. The focusing component is utilized for focusing the reflecting light to the image sensor. The image sensor is utilized for generating the sensed image according to the reflecting light. The defocus calibration module is utilized for calibrating the sensed image. The defocus calibration module comprises a calibrating object, and a calculating circuit. The calibrating object is located between the measured object and the focusing component. The calibrating object is utilized for blocking a part of the detecting light and a part of the reflecting light for forming images respectively at a first calibration imaging location and a second calibration imaging location in the sensed image. The calculating circuit is utilized for calibrating the sensed image according to the first calibration imaging location and the second calibration imaging location.

The present invention further provides a light-sensing system with defocus calibration function. The light-sensing system is utilized for sensing a measured object so as to generate a sensed image. The light-sensing system comprises a light-emitting component, an image sensor, a focusing component, and a defocus calibration module. The light-emitting component is utilized for emitting a detecting light to the measured object, so that the measured object accordingly generates a reflecting light. The image sensor is utilized for generating the sensed image according to the reflecting light. The focusing component is utilized for focusing the reflecting light to the image sensor. The defocus calibration module is utilized for calibrating the sensed image of the light-sensing system. The defocus calibration module comprises a calibrating object, and a calculating circuit. The calibrating object is located between the measured object and the focusing component. The calibrating object is utilized for blocking a part of the detecting light and a part of the reflecting light for forming images respectively at a first calibration imaging location and a second calibration imaging location in the sensed image. The calculating circuit is utilized for calibrating the sensed image according to the first calibration imaging location and the second calibration imaging location.

The present invention further provides a method of calibrating a light-sensing system. The light-sensing system is utilized for sensing a measured object for generating a sensed image. The light-sensing system has a light-emitting component, a focusing component, and an image sensor. The light-emitting component emits a detecting light to the measured object so that the measured object accordingly generates a reflecting light. The focusing component is utilized for focusing the reflecting light to the image sensor. The image sensor is utilized for generating the sensed image according to the reflecting light. The method comprises providing a calibrating object between the measured object and the focusing component, the calibrating object blocking a part of the detecting light and a part of the reflecting light for forming images respectively at a first calibration imaging location and a second calibration imaging location in the sensed image, and calibrating the sensed image according to the first calibration imaging location and the second calibration imaging location.

These and other objectives of the present invention will no doubt become obvious to those of ordinary skill in the art after reading the following detailed description of the preferred embodiment that is illustrated in the various figures and drawings.

DETAILED DESCRIPTION

The present invention provides a defocus calibration module applied in a light-sensing system. The defocus calibration module blocks a part of the detecting light and a part of the reflecting light for forming images at a first and a second calibration imaging locations in the sensed image, by means of disposing a calibrating object between the measured object and the focusing component. In this way, the defocus calibration module calculates a defocus parameter representing the defocus level of the light-sensing system according to the first and the second calibration imaging locations, and accordingly calibrates the sensed image so as to provide the user a clear image of the measured object.

Figure 1:
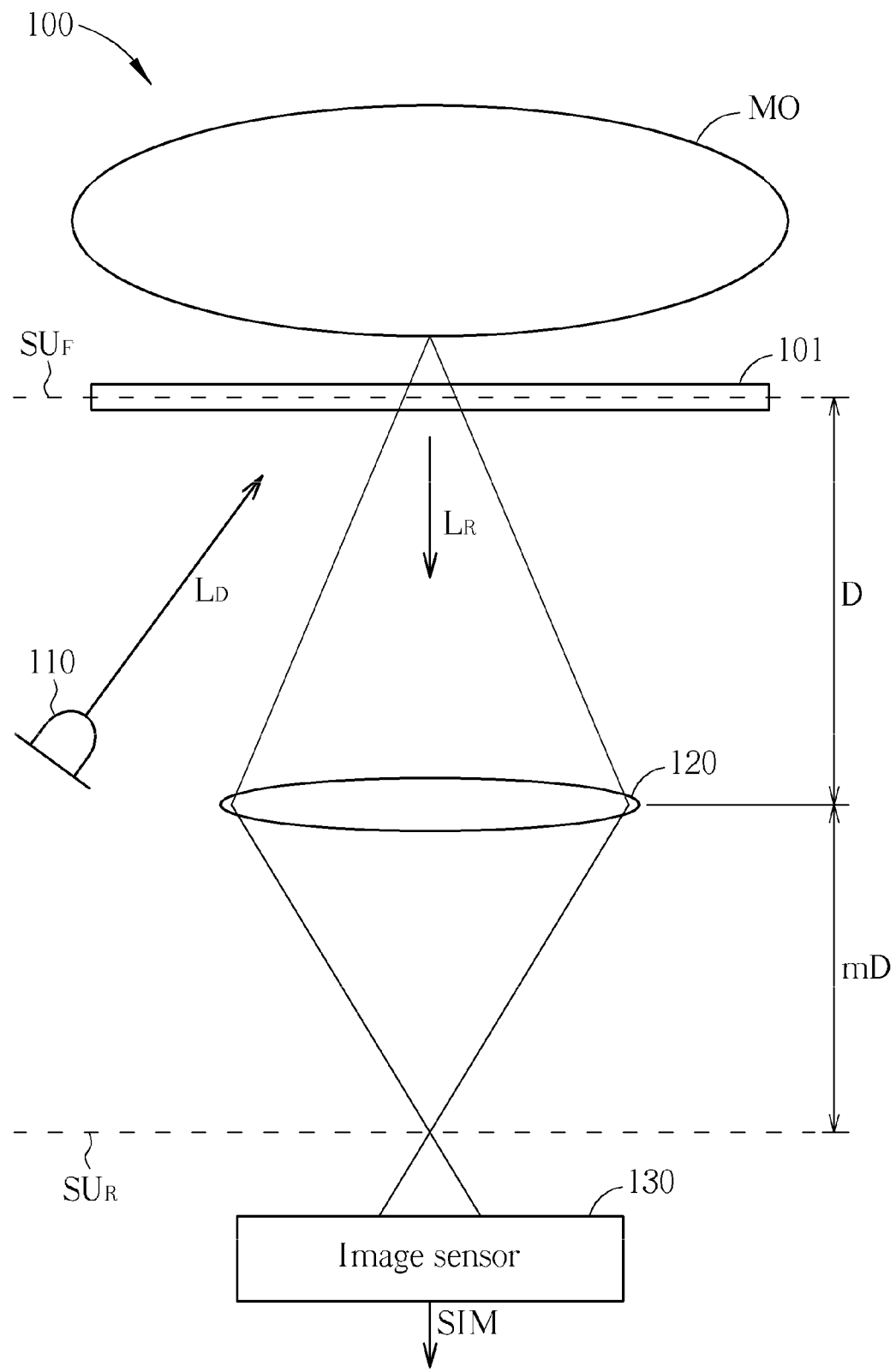
FIG. 1 is a diagram illustrating a conventional light-sensing system.
Figure 2:
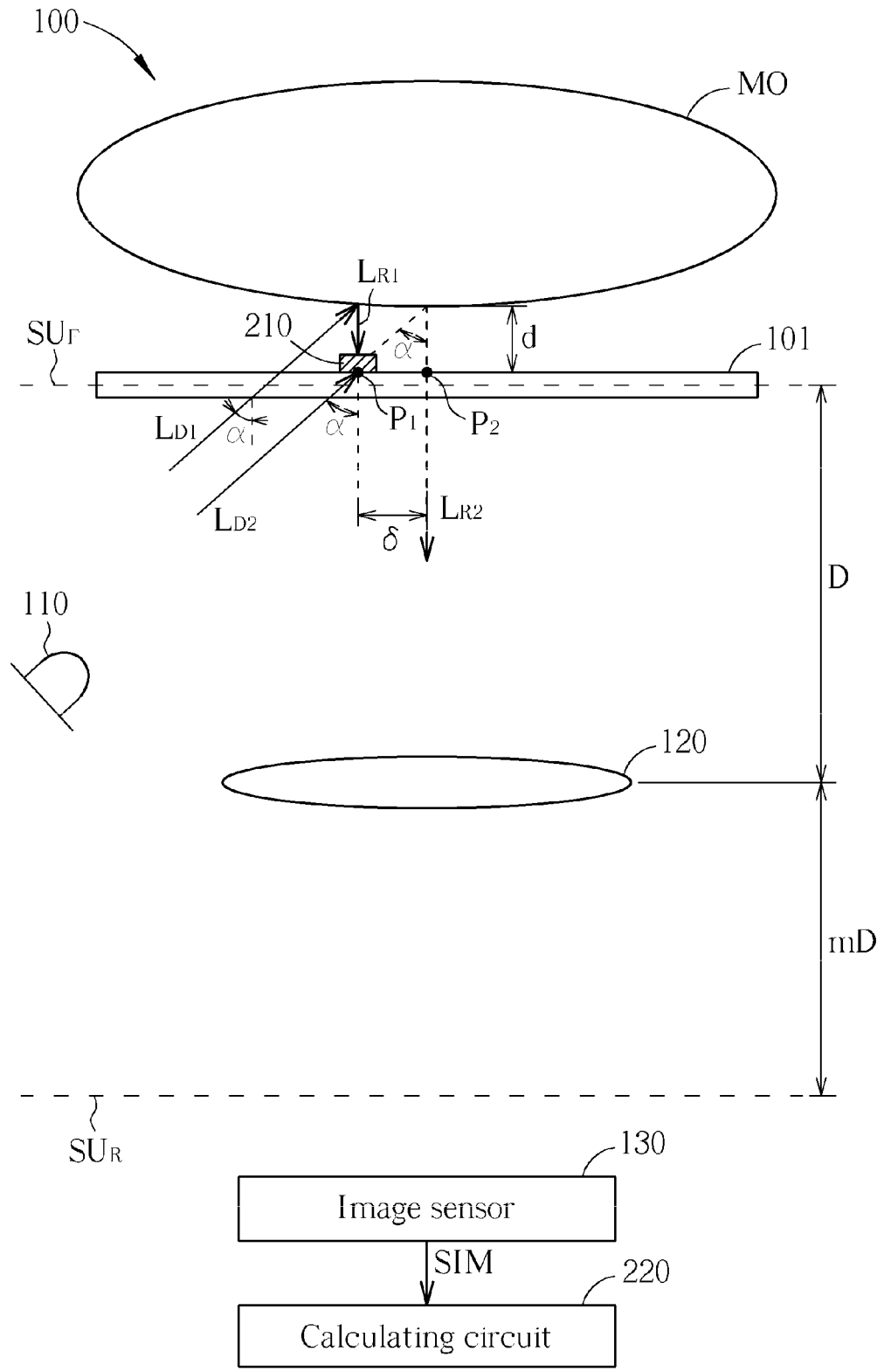
FIG. 2 is a diagram illustrating a defocus calibration module according to an embodiment of the present invention.

Please refer to FIG. 2. FIG. 2 is a diagram illustrating a defocus calibration module 200 according to an embodiment of the present invention. The defocus calibration module 200 is utilized for calibrating the sensing image SIM generated by the defocus light-sensing system 100. The defocus calibration module 200 includes a calibrating object 210 and a calculating circuit 220. The calibrating object 210 is located between the measured object MO and the focusing component 120. The calibrating object 210 is utilized for block a part of the detecting light $L_D$ and a part of the reflecting light $L_R$ for respectively forming images at calibration image locations $LOC_1$ and $LOC_2$ in the sensed image SIM. For example, when the light-emitting component 110 emits an infra-red light as the detecting light $L_D$, the calibrating object 210 is opaque to the infra-red light so as to block a part of the detecting light $L_D$ and a part of the reflecting light $L_R$. The calculating circuit 220 determines the defocus level of the light-sensing system 100 according to the calibration image locations $LOC_1$ and $LOC_2$, and accordingly calibrates the sensed image SIM. More particularly, the light-sensing system 100 is out of focus because of an object-distance error $ER_O$ and an image-distance error $ER_I$. The object-distance error $ER_O$ represents the difference between the distance, which is between the measured object MO and the focusing component 120, and the front focal distance D of the focusing component 120. That is, when the object-distance error $ER_O$ is not equal to zero, it represents the measured object MO is not located on the front focal surface $SU_F$ of the focusing component 120. The image-distance error $ER_I$ represents the difference between the distance, which is between the image sensor 130 and the focusing component 120, and the back focal distance mD of the focusing component 120. That is, when the image-distance error $ERI_I$ is not equal to zero, it represents the image sensor 130 is not located on the back focal surface $SU_R$ of the focusing component 120. Hence, the defocus level of the light-sensing system can be determined according to the object-distance error $ER_O$ and the image-distance error $ER_I$. In FIG. 2, it is assumed that the distance between the measured object MO and the substrate 101 is d; the substrate 101 is located on the front focal surface $SU_F$ of the focusing component 120; and the image sensor 130 is located on the back focal surface $SU_R$ of the focusing component 120. However, the meaning of the distance d actually represents the sum of the object-distance error $ER_O$ and the image-distance error $ER_I$. That is, even if the image sensor 130 is not located on the back focal surface $SU_R$ of the focusing component 120 so that the image-distance error $ER_I$ is not zero, the distance d can correctly represent the defocus level of the light-sensing system 100 as long as the distance d is set to be the sum of the object-distance error $ER_O$ and the image-distance error $ER_I$. In other words, the distance d is a defocus parameter which can represent the defocus level of the light-sensing system 100. Therefore, in the present invention, the calculating circuit 220 calculates the defocus parameter d of the light-sensing system 100 according to the calibration image locations $LOC_1$ and $LOC_2$, and calibrates the sensed image SIM according to the defocus parameter d. The operation principle of the defocus calibration module 200 is further illustrated in the following description.

First, the operation principle of the calculating circuit 220 calculating the defocus parameter d of the light-sensing system 100 according to the calibration image locations $LOC_1$ and $LOC_2$ is illustrated as below.

Figure 3:
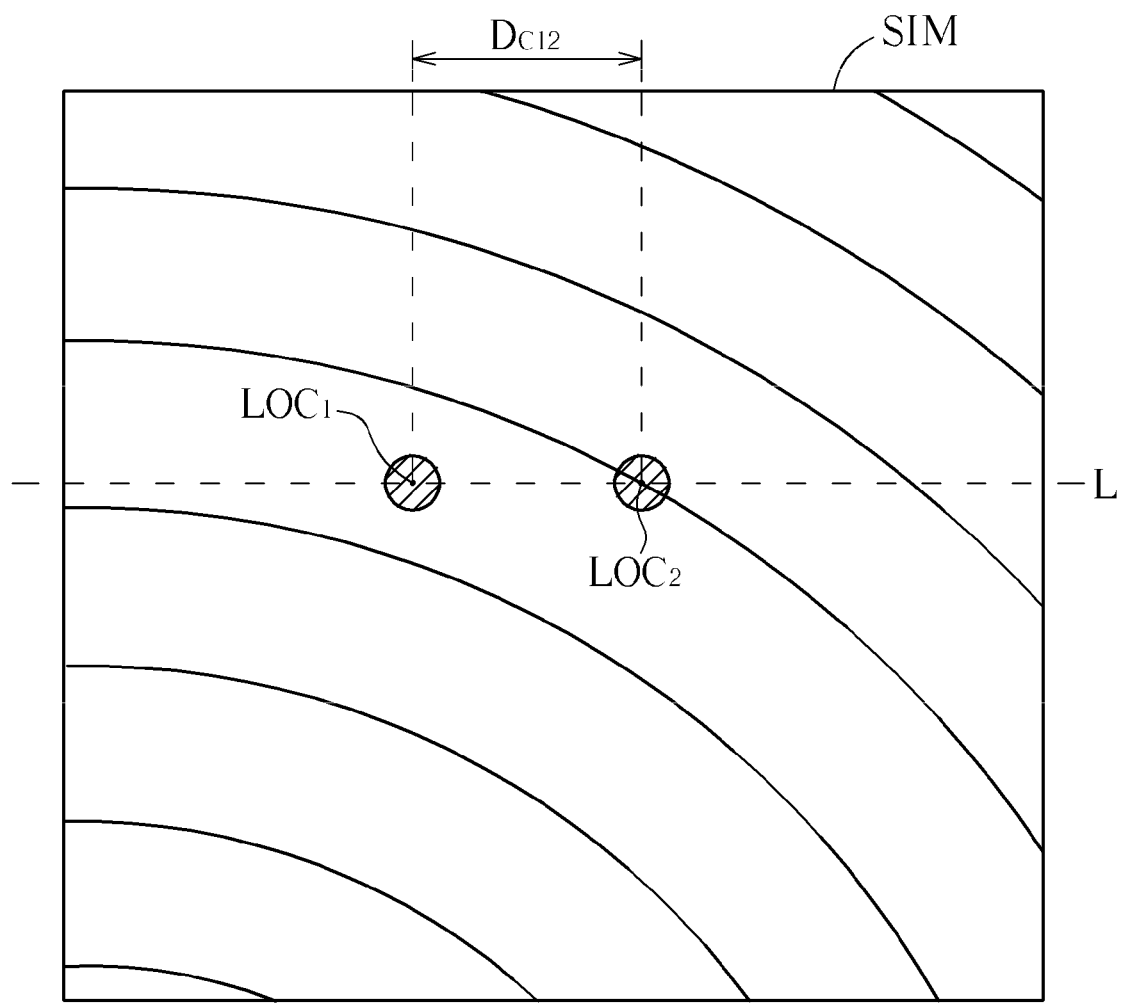
FIG. 3 is a diagram illustrating a part of the sensed image generated by the image sensor.
Figure 4:
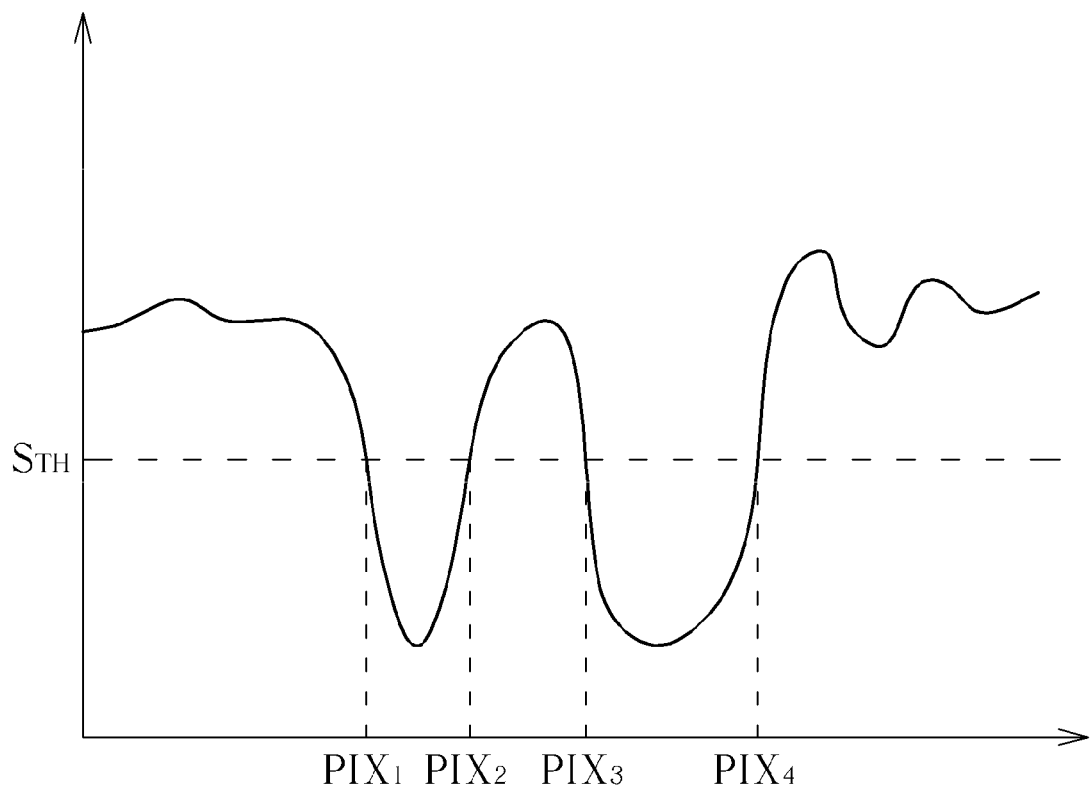
FIG. 4 is a waveform diagram of the signal that the calculating circuit obtains along the cut line shown in FIG. 3.

In FIG. 2, the detecting light $L_{D1}$ emits to the measured object MO at a predetermined incidence angle α, so that the measured object MO accordingly generates a reflecting light $L_{R1}$. When the reflecting light $L_{R1}$ emits to the substrate 101, the reflecting light $L_{R1}$ is blocked by the calibrating object 210. In addition, when the detecting light $L_{D2}$ emits to the substrate 101 at the predetermined incidence angle α, the detecting light $L_{D2}$ is blocked by the calibrating object 210. Since the detecting light $L_{D2}$ can not reach the measured object MO, the measured object does not generate the reflecting light $L_{R2}$ (shown by the dashed line) corresponding to the detecting light $L_{D2}$. In other words, the image sensor 130 does not receive the reflecting lights $L_{R1}$ and $L_{R2}$. For instance, please refer to FIG. 3. FIG. 3 is a diagram illustrating a part of the sensed image SIM generated by the image sensor 130. In FIG. 3, it is assumed that the calibrating object 210 is round and the measured object MO is a finger. The curves shown in FIG. 3 represent the fingerprint of the finger. The circles respectively represent the regions where the image sensor 130 can not receive the reflecting lights $L_{R1}$ and $L_{R2}$ blocked by the calibrating object 210. That is, the locations of the circles are the calibration image locations $LOC_1$ and $LOC_2$ where the calibrating object 210 forms images in the sensed image SIM. More particularly, the calibrating object 210 blocks the reflecting light $L_{R1}$ to form a blocking point $P_1$ on the substrate 101, so that the blocking point $P_1$ forms image at the calibration image location $LOC_1$; the calibrating object 210 blocks the detecting light $L_{D2}$ to form a blocking point $P_2$ on the substrate 101, so that the blocking point $P_2$ forms image at the calibration image location $LOC_2$. It can be seen in FIG. 2 that the defocus parameter d can be calculated according to the following formula:

$$d = \frac{\delta}{\tan\alpha}; \quad (1)$$

wherein δ represents the distance between the blocking points $P_1$ and $P_2$. Since the magnification of the focusing component 120 is m, the distance $D_{C12}$ between the calibration image locations $LOC_1$ and $LOC_2$ is equal to (m×δ). In other words, the calculating circuit 220 calculates the distance δ between the blocking points $P_1$ and $P_2$ according to the distance $D_{C12}$ between the calibration image locations $LOC_1$ and $LOC_2$ in the sensed image SIM, and further obtains the defocus parameter d. For instance, please refer to FIG. 4. FIG. 4 is a waveform diagram of the signal that the calculating circuit 220 obtains along the cut line L in FIG. 3. When the image sensor 130 does not receive the reflecting light $L_R$, the signal generated by the image sensor 130 has a lower value. As a result, in FIG. 4, the part of the signal lower a threshold value $S_{TH}$ corresponds to the calibration image locations $LOC_1$ and $LOC_2$. Hence, the locations of centers of the circles in FIG. 3 is respectively obtained according to the pixels $PIX_1 \sim PIX_2$ and $PIX_3 \sim PIX_4$ of the image sensor 130 corresponding to the threshold value $S_{TH}$. Since the locations of the centers of the circles are the calibration image locations $LOC_1$ and $LOC_2$, the calculating circuit 220 can obtain the distance $D_{C12}$ between the calibration image locations $LOC_1$ and $LOC_2$, and calculates the defocus parameter d according to the following formula:

$$d = \frac{D_{C12}}{m \times \tan\alpha}. \quad (2)$$

The operation principle of the calculating circuit 220 calibrating the sensed image SIM according to the defocus parameter d of the light-sensing system 100 is illustrated as below.

Figure 5:
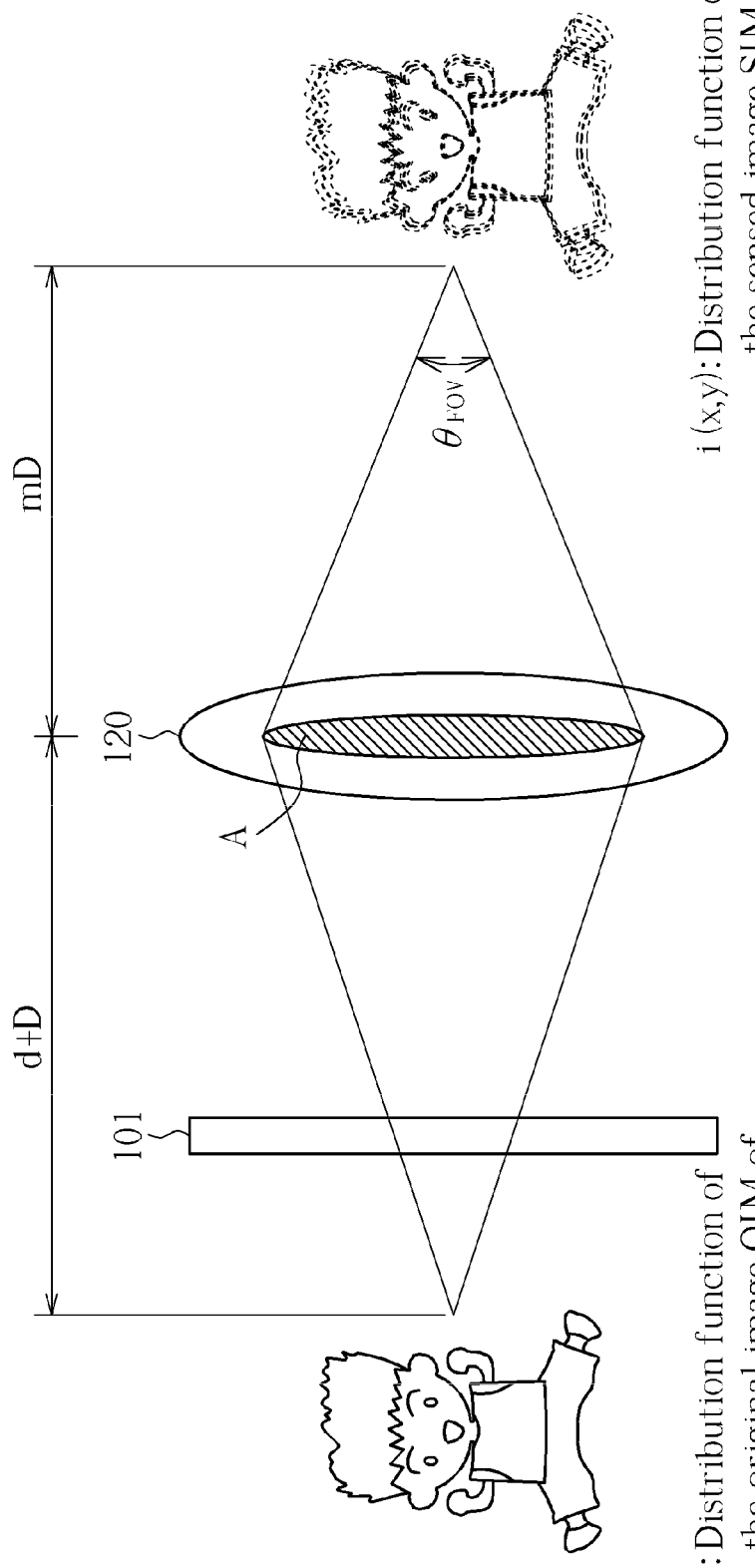
FIG. 5 is a diagram illustrating the method of calibrating the sensed image according to the defocus parameter.

Please refer to FIG. 5. FIG. 5 is a diagram illustrating the method of calibrating the sensed image SIM according to the defocus parameter d. The clear image (shown in human shape by solid line) in the left part of FIG. 5 represents the original image OIM of the measured object MO, and the distribution of the original image OIM of the measured object MO is represented by the function o(x,y), where x represents a value along the x-axis in the spatial domain and y represents a value along the y-axis in the spatial domain. The unclear image (shown in human shape by dashed line) in the right part of FIG. 5 represents the sensed image SIM of the measured object MO, and the distribution of the sensed image SIM of the measured object MO is represented by the function i(x,y). The light-sensing system 100 is out of focus because of an assembling error (for instance, the assembling error causes the object-distance error $ER_O$ and the image-distance error $ER_I$). Hence, the original image OIM of the measured object MO forms the unclear sensed image SIM on the image sensor 130 through the focusing component 120. The relation among the sensed image SIM, the origin image OIM, and the light-sensing system is further illustrated in the following description.

The characteristics of the light-sensing system 100 can be represented by a Point Spread Function (PSF) h(x,y). According to "Fourier Optics", the distribution function i(x,y) of the sensed image SIM is the convolution of the distribution function o(x,y) of the original image OIM and the point spread function h(x,y) of the light-sensing system 100. Therefore, the relation among he distribution function i(x,y) of the sensed image SIM, the distribution function o(x,y) of the original image OIM, and the point spread function h(x,y) of the light-sensing system 100 is represented as the following formula:

$$i(x,y)=o(x,y)*h(x,y)+n(x,y) \quad (3);$$

wherein the symbol "*" in formula (3) represents convolution; and n(x,y) represents the distribution function of the received noise of the image sensor 130. In addition, the point spread function h(x,y) of the light-sensing system 100 in formula (3) is determined according to the object distance between the measured object MO and the focusing component 120, the image distance between the image sensor 130 and the focusing component 120, the effective focal region A of the focusing component 120, and the magnification m of the focusing component 120. When the reflecting light $L_R$ passes through the focusing component 120, the image sensor 130 only can receive the reflecting light $L_R$ passing through the effective focal region A of the focusing component 120. For instance, the viewing angle of the image sensor 130 is $\theta_{FOV}$ shown in FIG. 5. Since the reflecting light $L_{RD}$ out of the region of the viewing angle $\theta_{FOV}$ can not reach the image sensor 130, the effective focal region A can be represented by the function P(X,Y), as the following formula, where X represents a value along the x-axis in the spatial frequency domain and Y represents a value along the y-axis in the spatial frequency domain:

$$P(X, Y) = \begin{cases} 1, \wedge \sqrt{X^2 + Y^2} \leq mD\sin\frac{\theta_{FOV}}{2} \\ 0, \wedge \sqrt{X^2 + Y^2} > mD\sin\frac{\theta_{FOV}}{2}; \end{cases} \quad (4)$$

In addition, the length of the distance between the measured object MO and the focusing component 120 is equal to the sum of the defocus parameter d and the front focal distance D of the focusing component 120. The length of the distance between the image sensor 130 and the focusing component 120 is equal to that of the back focal distance mD of the focusing component. Therefore, the point spread function h(x,y) of the light-sensing system 100 can be obtained according to the prior art about "Fourier Optics" (the process of calculating the point spread function h(x,y) is well-known by people skilled in the art, and will be omitted for brevity), and the point spread function h(x,y) is represented by the following formula:

$$h(x, y) = \left| \int\int_A e^{-j\frac{2\pi}{\lambda}[\phi(X,Y)+\frac{xX+yY}{2mD}]} dXdY \right|^2; \text{ and} \quad (5)$$

$$\phi(X, Y) = m^2 d\left(\frac{\sqrt{X^2 + Y^2}}{mD} - 1\right);$$

In this way, since the distribution function i(x,y) of the sensed image SIM and the point spread function h(x,y) are known, the calculating circuit 220 calculates the distribution function o(x,y) of the original image OIM of the measured object MO according to the following formula, by means of the Inverse Fourier Transform of formula (3):

$$o(x, y) = \Im^{-1}\left\{\frac{I(X, Y)}{H(X, Y)} \frac{|H(X, Y)|^2 |O(X, Y)|^2}{|H(X, Y)|^2 |O(X, Y)|^2 + |N(X, Y)|^2}\right\}; \quad (6)$$

wherein $\Im^{-1}$ represents Inverse Fourier Transform; I(X,Y) represents a transferred sensed image function which is the fourier transform of the distribution function i(x,y) of the sensed image SIM; H(X,Y) represents a transferred point spread function which is the fourier transform of the point spread function h(x,y); and N(X,Y) represents a transferred noise function which is the fourier transform of the distribution function n(x,y) of the noise of the image sensor 130. Provided that the noise of the image sensor 130 is a white noise, $$\frac{|N(X, Y)|^2}{|O(X, Y)|^2}$$

is equal to a predetermined constant Γ. In this way, the following formula is obtained according to the formula (6):

$$o(x, y) = \mathcal{S}^{-1} \left\{ \frac{I(X, Y)}{H(X, Y)} \frac{|H(X, Y)|^2}{|H(X, Y)|^2 + \Gamma} \right\}; \quad (7)$$

consequently, the distribution function o(x,y) of the original image OIM of the measured object MO is calculated by the calculating circuit 220 according to the formula (7).

To sum up, in the defocus calibration module 200 of the present invention, the calculating circuit 220 calculates the point spread function h(x,y) of the light-sensing system 100 according the defocus parameter d. Since the distribution function i(x,y) of the sensed image SIM is the convolution of the distribution function o(x,y) of the original image OIM of the measured object MO and the point spread function h(x,y), the calculating circuit 220 calculates the distribution function o(x,y) of the original image OIM of the measured object MO by means of the method of Inverse Fourier Transform, so as to obtain the clear image of the measured object MO.

In addition, in the defocus calibration module 200 of the present invention, the calibrating object 210 can be disposed on the substrate 101 by means of ink-printing. As long as the location of the calibrating object 210 on the substrate 101 is properly designed, the calibration image locations $LOC_1$ and $LOC_2$ are located at the edge region of the sensed image SIM. That is, although the calibrating object 210 blocks a part of the detecting light $L_D$ and a part of the reflecting light $L_R$, the reflecting light $L_R$ generated by the main part of the measured object MO (for instance, the center part of the measured object MO) is not blocked by the calibrating object 210, so that the sensed image SIM generated by the image sensor 130 does not lost the information about the main characteristics of the measured object MO. In addition, the calibrating object 210 is round shape or regular polygon shape so that the calculating circuit 220 can easily determine the calibration imaging locations $LOC_1$ and $LOC_2$ where the calibrating object 210 forms images in the sensed image SIM.

Figure 6:
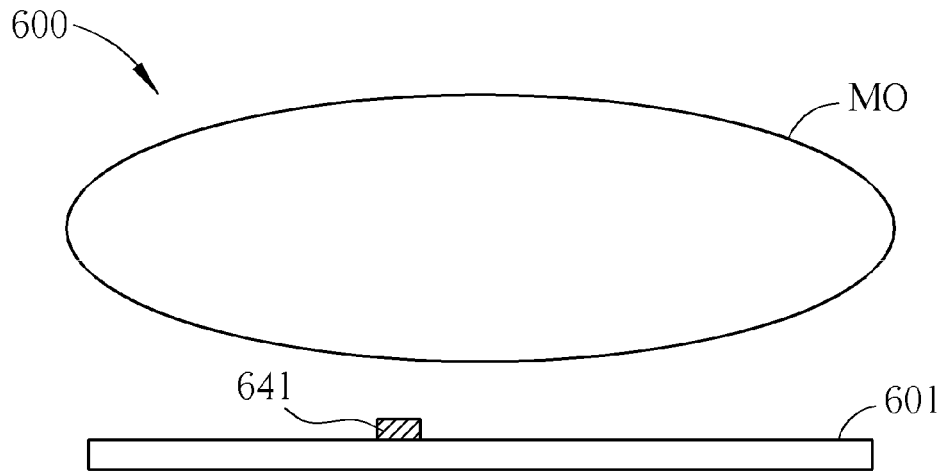
FIG. 6 is a diagram illustrating a light-sensing system with defocus calibration function according to an embodiment of the present invention.
Figure 6:
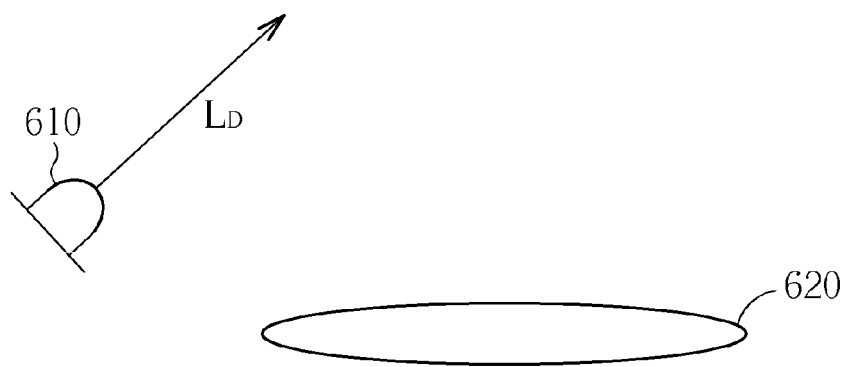
Figure 6:
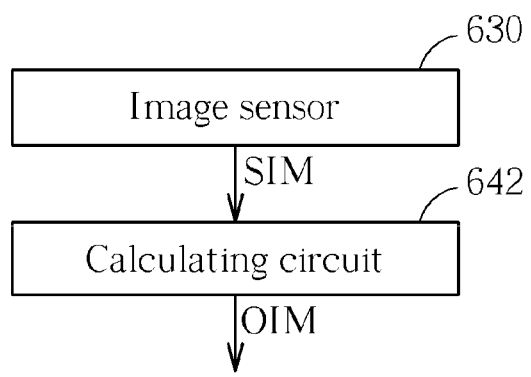

Please refer to FIG. 6. FIG. 6 is a diagram illustrating a light-sensing system 600 with defocus calibration function according to an embodiment of the present invention. The light-sensing system 600 is utilized sensing a measured object MO so as to generate a sensed image SIM. The light-sensing system 600 includes a light-emitting component 610, a focusing component 620, an image sensor 630, and a defocus calibration module 640. The structure and the operation principle of the light-emitting component 610, the focusing component 620, and the image sensor 630 are respectively similar to those of the light-emitting component 110, the focusing component 120, and the image sensor 130, and will not be repeated again for brevity. The defocus calibration module 640 includes a calibrating object 641, and a calculating circuit 642. The calibrating object 641 is disposed on the substrate 601. The structure and the operation principle of the defocus calibration module 640, the calibrating object 641, and the calculating circuit 642 are respectively similar to those of the defocus calibration module 200, the calibrating object 210, and the calculating circuit 220. The calibrating object 641 forms images at the calibration image locations $LOC_1$ and $LOC_2$ in the sensed image SIM. The calculating circuit 642 calculates a defocus parameter d representing the defocus level of the light-sensing system 600 according to the calibration image locations $LOC_1$ and $LOC_2$. By means of the method illustrated in FIG. 5, the calculating circuit 642 calibrates the sensed image SIM according to the defocus parameter d so as to obtain the clear image of the measured object MO.

In conclusion, the present invention provides a defocus calibration module for calibrating a sensed image generated by a light-sensing system when the light-sensing system is out of focus. The defocus calibration module of the present invention respectively forms images at a first calibration image location and a second calibration image location by means of the calibrating object blocking a part of the detecting light and a part of the reflecting light. The calculating circuit of the defocus calibration module of the present invention calculates a defocus parameter representing the defocus level of the light-sensing system according to the first calibration image location and the second calibration image location. The point spread function of the light-sensing system is further obtained according to the defocus parameter. Since the sensed image generated by the image sensor is the convolution of the original image of the measured object and the point spread function, the calculating circuit calculates the clear original image of the measured object according to the sensed image and the point spread function. In addition, the present invention further provides a light-sensing system. Even if the light sensing system of the present invention has an assembling error or the measured object is not on the focal surface of the focusing component, the light-sensing system still can calibrate the sensed image generated by the image sensor by means of the defocus calibration module of the present invention, so as to obtain the clear image of the measured object.

Those skilled in the art will readily observe that numerous modifications and alterations of the device and method may be made while retaining the teachings of the invention.

What is claimed is:

1. A defocus calibration module, applied in a light-sensing system, the light-sensing system being utilized for sensing a measured object for generating a sensed image, the light-sensing system having a light-emitting component, a focusing component, and an image sensor, the light-emitting component emitting a detecting light to the measured object so that the measured object accordingly generates a reflecting light, the focusing component being utilized for focusing the reflecting light to the image sensor, the image sensor being utilized for generating the sensed image according to the reflecting light, the defocus calibration module being utilized for calibrating the sensed image, the defocus calibration module comprising:

a calibrating object, located between the measured object and the focusing component, for blocking a part of the detecting light and a part of the reflecting light for forming images respectively at a first calibration imaging location and a second calibration imaging location in the sensed image; and a calculating circuit, for calibrating the sensed image according to the first calibration imaging location and the second calibration imaging location, wherein the calculating circuit calculates a defocus parameter of the light-sensing system according to the first calibration imaging location, the second calibration imaging location, and a predetermined incidence angle of the detecting light, and calculates an original image of the measured object according to the defocus parameter and the sensed image;

wherein the defocus parameter represents a sum of an object-distance error and an image-distance error;

wherein the object-distance error is a difference between a length of a distance, which is between the measured object and the focusing component, and a length of a front focal distance of the focusing component;

wherein the image-distance error is a difference between a length of a distance, which is between the image sensor and the focusing component, and a length of a back focal distance of the focusing component.

2. The defocus calibration module of claim 1, wherein the calibrating object is round shape or regular polygon shape for the calculating circuit determining the first calibration imaging location and the second calibration imaging location where the calibrating object forms images in the sensed image.

3. The defocus calibration module of claim 1, wherein the light-emitting component emits an infra-red light as the detecting light, and the calibrating object is opaque to the infra-red light so as to block the part of the detecting light.

4. The defocus calibration module of claim 1, wherein the calibrating object is disposed on a substrate by means of ink-printing.

5. The defocus calibration module of claim 4, wherein the calibrating object is disposed on a location of the substrate for setting the first calibration imaging location and the second calibration imaging location to be located in an edge region of the sensed image.

6. The defocus calibration module of claim 1, wherein the calculating circuit calculates the defocus parameter according to a following formula:

$$d = \frac{D_{C12}}{m \times \tan\alpha};$$

Wherein α represents the predetermined incidence angle of the detecting light;

$D_{C12}$ represents a distance between the first calibration imaging location and the second calibration imaging location; m represents a magnification of the focusing component; and d represents the defocus parameter.

7. The defocus calibration module of claim 6, wherein the calculating circuit calculates a point spread function (PSF) of the light-sensing system according to the defocus parameter, and calculates the original image of the measured object according to the point spread function and the sensed image.

8. The defocus calibration module of claim 7, wherein the calculating circuit calculates the point spread function according to following formulas:

$$h(x, y) = \left| \int\int_A e^{-j\frac{2\pi}{\lambda}[\phi(X,Y)+\frac{xX+yY}{2mD}]} dXdY \right|^2; \text{ and}$$

$$\phi(X, Y) = m^2 d\left(\frac{\sqrt{X^2+Y^2}}{mD} - 1\right);$$

wherein h(x,y) represents the point spread function; A represents an effective focal region of the focusing component; D represents a predetermined distance between the substrate and focusing component; x represents a value along the x-axis in the spatial domain; y represents a value along the y-axis in the spatial domain; X represents a value along the x-axis in the spatial frequency domain; and Y represents a value along the y-axis in the spatial frequency domain.

9. The defocus calibration module of claim 8, wherein the calculating circuit calculates the original image of the measured object according to a following formula:

$$o(x, y) = \mathfrak{I}^{-1}\left\{\frac{I(X, Y)}{H(X, Y)} \frac{|H(X, Y)|^2 |O(X, Y)|^2}{|H(X, Y)|^2 |O(X, Y)|^2 + |N(X, Y)|^2}\right\};$$

wherein o(x,y) represents a distribution function of the original image of the measured object; $\mathfrak{I}^{-1}$ represents Inverse Fourier Transform; I(X,Y) represents a transferred sensed image function which is a fourier transform of a distribution function of the sensed image; H(X,Y) represents a transferred point spread function which is a fourier transform of the point spread function; and N(X,Y) represents a transferred noise function which is a fourier transform of a distribution function of a noise of the image sensor.

10. A method of calibrating a light-sensing system, the light-sensing system being utilized for sensing a measured object for generating a sensed image, the light-sensing system having a light-emitting component, a focusing component, and an image sensor, the light-emitting component emitting a detecting light to the measured object so that the measured object accordingly generates a reflecting light, the focusing component being utilized for focusing the reflecting light to the image sensor, the image sensor being utilized for generating the sensed image according to the reflecting light, the method comprising:

providing a calibrating object between the measured object and the focusing component;

the calibrating object blocking a part of the detecting light and a part of the reflecting light for forming images respectively at a first calibration imaging location and a second calibration imaging location in the sensed image; and calibrating the sensed image according to the first calibration imaging location and the second calibration imaging location, wherein calibrating the sensed image according to the first calibration imaging location and the second calibration imaging location comprises calculating a defocus parameter of the light-sensing system according to the first calibration imaging location, the second calibration imaging location, and a predetermined incidence angle of the detecting light; and calculating an original image of the measured object according to the defocus parameter and the sensed image;

wherein the defocus parameter represents a sum of an object-distance error and an image-distance error;

wherein the object-distance error is a difference between a length of a distance, which is between the measured object and the focusing component, and a length of a front focal distance of the focusing component;

wherein the image-distance error is a difference between a length of a distance, which is between the image sensor and the focusing component, and a length of a back focal distance of the focusing component.

11. The method of claim 10, wherein providing the calibrating object between the measured object and the focusing component comprising:

disposing the calibrating object on a substrate by means of ink-printing.

12. The method of claim 11, wherein the calibrating object is disposed on a location of the substrate for setting the first calibration imaging location and the second calibration imaging location to be located in an edge region of the sensed image.

13. The method of claim 10, wherein the defocus parameter is calculated according to a following formula:

$$d = \frac{D_{C12}}{m \times \tan\alpha};$$

Wherein a represents the predetermined incidence angle of the detecting light;
$D_{C12}$ represents a distance between the first calibration imaging location and the second calibration imaging location; m represents a magnification of the focusing component; and d represents the defocus parameter.

14. The method of claim 13, wherein calculating the original image of the measured object according to the defocus parameter and the sensed image comprising:
calculating a point spread function (PSF) of the light-sensing system according to the defocus parameter; and
calculating the original image of the measured object according to the point spread function and the sensed image.

15. The method of claim 14, wherein the point spread function is calculated according to following formulas:

$$h(x, y) = \left| \int\int_A e^{-j\frac{2\pi}{\lambda}[\phi(X,Y)+\frac{xX+yY}{2mD}]} dX dY \right|^2; \text{ and}$$

$$\phi(X, Y) = m^2 d\left(\frac{\sqrt{X^2+Y^2}}{mD} - 1\right);$$

wherein h(x,y) represents the point spread function; A represents an effective focal region of the focusing component; D represents a predetermined distance between the substrate and focusing component; x represents a value along the x-axis in the spatial domain; y represents a value along the y-axis in the spatial domain; X represents a value along the x-axis in the spatial frequency domain; and Y represents a value along the y-axis in the spatial frequency domain.

16. The method of claim 15, wherein the original image of the measured object is calculated according to a following formula:

$$o(x, y) = \Im^{-1}\left\{\frac{I(X, Y)}{H(X, Y)} \frac{|H(X, Y)|^2 |O(X, Y)|^2}{|H(X, Y)|^2 |O(X, Y)|^2 + |N(X, Y)|^2}\right\};$$

wherein o(x,y) represents a distribution function of the original image of the measured object; $\Im^{-1}$ represents Inverse Fourier Transform; I(X,Y) represents a transferred sensed image function which is a fourier transform of a distribution function of the sensed image; H(X,Y) represents a transferred point spread function which is a fourier transform of the point spread function; and N(X,Y) represents a transferred noise function which is a fourier transform of a distribution function of a noise of the image sensor.

* * * * *